Patented June 29, 1926.

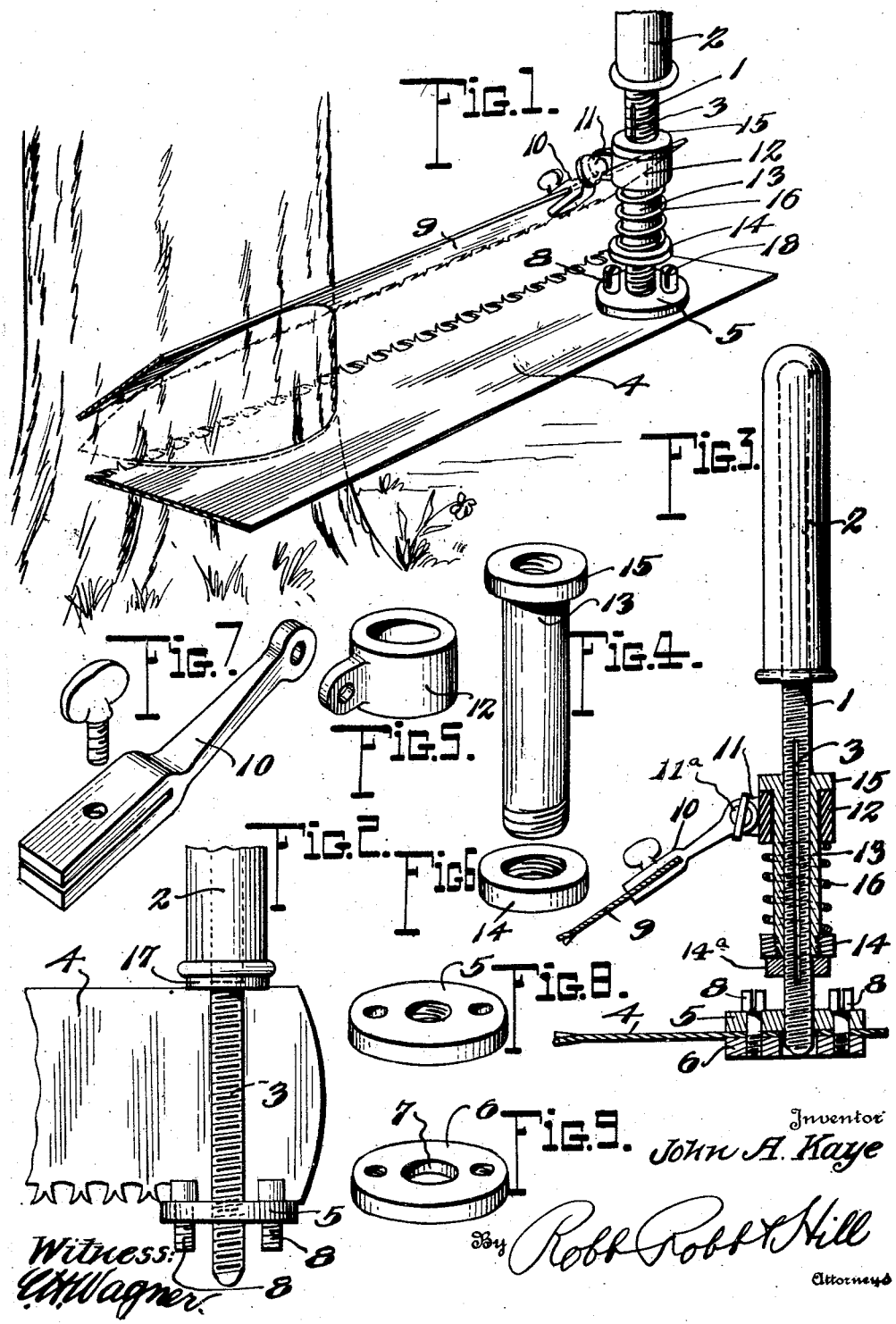

1,590,464

UNITED STATES PATENT OFFICE.

JOHN A. KAYE, OF SAULT STE. MARIE, ONTARIO, CANADA.

TREE-NOTCHING DEVICE.

Application filed April 20, 1925. Serial No. 24,401.

The present invention relates to a sawing device and has for its object to provide a device of this character which embodies novel features of construction, whereby a wedge shaped block can be cut out from a piece of wood by the action of two saw blades which are arranged at an angle to each other.

Further objects of the invention are to provide a saw device of this character which is comparatively simple and inexpensive in its construction, which can be easily manipulated, and which can be used for forming a notch in the base of a tree trunk preparatory to felling the tree.

The invention also contemplates the provision of a novel form of saw handle which can be applied to the main saw blade with the handle either in the plane of the saw blade or at right angles thereto, depending upon the particular mounting which is most advantageous for the kind of work to be performed.

One particular embodiment of the invention is shown and described in this application for illustrative purposes, although it will be understood that many modifications and changes can be made in the details of construction without departing from the spirit of the invention.

For a full understanding of the invention reference is to be had to the following description and accompanying drawings in which, Figure 1 is a perspective view of one end of a cross cut sawing device which is constructed in accordance with the invention, showing the same in the position assumed when being employed for cutting a wedge shaped block from the base of a tree for the purpose of notching the tree preparatory to felling the same.

Figure 2 is a view of one end of the main saw blade, showing the same as applied to the handle, with the handle in the plane of the saw blade.

Figure 3 is a transverse sectional view showing the manner of mounting the two saw blades when they are arranged as indicated by Figure 1.

Figure 4 is a detail view of the sleeve which is adjustably mounted upon the stem of the handle.

Figure 5 is a detail view of the collar which is slidable upon the said sleeve.

Figure 6 is a detail view of the nut which is threaded on the lower end of the sleeve.

Figure 7 is a detail view of one of the brackets which are utilized for mounting the auxiliary saw blade.

Figure 8 is a detail view of the nut which is used in securing the main saw blade to the handle, and Figure 9 is a detail view of the clamping plate which cooperates with the nut to engage the main saw blade.

Corresponding and like parts are referred to in the following description and indicated on all of the views of the drawing by like reference characters.

Referring to the drawings, the numeral 1 designates a threaded stem which has a tubular handle 2 fitted thereon, a stem and handle being adapted to be applied to each end of the saw blade so that the latter can be handled and manipulated in the same manner as the well known cross cut saw. The threaded stem 1 is formed with a longitudinal slot 3 which may receive the saw blade 4 when the same is fastened in position in the plane of the handle, as shown by Figure 2. When the handles are applied to opposite ends of the saw blade in this manner the saw can be manipulated in the same manner as an ordinary cross cut saw, although when notching or cutting a tree trunk it is preferable to secure the handle to the saw blade at right angles to the latter, as shown by Figure 1, since with this arrangement it is possible to cut the tree closer to the ground and there is less wastage in the form of a stump.

With the arrangement shown by Figure 1 the saw blade 4 is clamped between an upper disc 5 which is threaded upon the stem 1, and a lower disc or clamping plate 6 which has a large central opening 7 to receive the end of the stem 1 and is connected to the disc 5 by means of the screws 8. The saw blade is provided at the end thereof with suitable openings to receive the stem 1 and screws 8. The disc 5 has a threaded engagement with the stem and can be adjusted to any desired position in the length thereof, and when the screws 8 are tightened the saw blade is securely clamped between the disc 5 and the clamping plate or disc 6.

The auxiliary saw blade 9 is arranged above the main saw blade 4 and arranged in an angular relation thereto. The end of the auxiliary saw blade 9 is engaged by a clamp 10, which is hingedly connected at 11 to a collar 12, said collar being slidable upon a sleeve 13. A clamping screw 11ᵃ at the hinge connection 11 enables the auxiliary saw to be adjusted and set at any desired angle, depending upon the depth of the notch which it is desired to cut in the side of the tree trunk.

The sleeve 13 is threaded upon the stem 1, and can be adjusted up and down thereon to any desired position. A nut 14 is threaded upon the lower end of the sleeve, and a jam nut 14ᵃ may be threaded upon the stem 1 and caused to engage the lower end of the sleeve for locking the sleeve in an adjusted position. The collar 12 normally engages a shoulder 15 in the upper end of the sleeve, and a coil spring 16 which surrounds the lower end of the sleeve is interposed between the collar 12 and the nut 14. This spring normally tends to slide the collar upwardly and hold it against the shoulder 15, although the collar is mounted so that it can slide downwardly upon the sleeve against the action of the spring 16.

When the device is used for sawing a notch in the side of a tree trunk, as shown by Figure 1, the auxiliary blade 9 is set and firmly clamped at the desired angle to the main saw blade 4. The two saw blades will then bite their way simultaneously into the tree trunk as the device is reciprocated back and forth in the usual way. As the auxiliary saw 9 enters the tree trunk the inclined cut made thereby tends to move it downwardly toward the main saw 4, although the auxiliary saw moves in a direction parallel to itself, so that it always has the same angular relation to the main saw blade. The inclined cut produced by the auxiliary saw 9 will eventually intersect the cut produced by the main saw 4, with the result that a wedge shaped block will be cut out from the tree trunk. This results in notching the tree trunk in substantially the same manner that tree trunks are ordinarily notched with an ax, and the use of this saw device not only facilitates the formation of the notch, but also enables the notch to be formed close to the ground so that there will be very little of the tree trunk remaining in the stump.

When the main saw blade 4 is secured to the handle in the plane thereof, as shown by Figure 2, a washer or plate 17 with a transverse groove in the lower face thereof is interposed between the lower end of the tubular handle member 2 and the upper edge of the saw blade, the said upper edge of the saw blade being received within the groove of the washer member. The lower edge of the saw blade may be engaged by the kerfs or notches in the upper ends of the screws 8.

The disc 5 is properly positioned upon the stem 1, and after the end of the saw has been inserted through the longitudinal slot 3 of the stem and properly engaged by the screws 8 and washer 17 the handle 2 can be screwed downwardly to clamp the parts tightly together. When the parts are assembled in this manner the auxiliary saw blade 9 is omitted and the main saw blade can be used in the same manner as an ordinary cross cut saw.

Having thus described my invention what I claim as new and desire to secure by Letters Patent is,

1. A sawing device of the character described, including a stem, a main saw blade mounted thereon, an auxiliary saw blade arranged at an angle to the first saw blade, and means for mounting the auxiliary saw blade upon the stem so that it is movable transversely to itself while maintaining its inclination in the same plane.

2. A sawing device of the character described, including a stem, a main saw blade mounted thereon, an auxiliary saw blade arranged at an angle to the main saw blade, means for adjusting the angle of the auxiliary saw blade, and means for mounting the auxiliary saw blade upon the stem so that it is movable transversely to itself while maintaining its inclination in the same plane.

3. A sawing device of the character described, including a stem, a main saw blade mounted thereon, an auxiliary saw blade arranged at an angle to the main saw blade, and means for yieldably mounting the auxiliary saw blade upon the stem, so that it is movable transversely to itself while maintaining its inclination in the same plane.

4. A sawing device of the character described, including a stem, a main blade mounted upon the stem, a slide upon the stem, and an auxiliary saw blade carried by the slide and arranged at an angle to the main saw blade.

5. A sawing device of the character described, including a stem, a main saw blade mounted thereon, a guide member adjustably mounted upon the stem, a slide mounted upon the guide member, and an auxiliary saw blade carried by the slide and arranged at an angle to the main saw blade.

6. A sawing device of the character described, including a stem, a main saw blade mounted upon the stem, a sleeve adjustably mounted upon the stem, means for locking the sleeve in an adjusted position, a slide mounted upon the sleeve, and an auxiliary saw blade carried by the slide and arranged at an angle to the main saw blade.

7. A sawing device of the character described, including a stem, a main saw blade mounted upon the stem, a sleeve applied to the stem, a slide mounted upon the sleeve, a spring engaging the slide and tending to move the same away from the main saw blade, and an auxiliary saw blade carried by the slide and arranged at an angle to the main saw blade.

8. A sawing device of the character described, including a stem, a main saw blade rigidly mounted upon the stem, a slide carried by the stem, yielding means normally tending to move the slide away from the main saw blade, an auxiliary saw blade carried by the slide, and means for mounting the auxiliary saw blade in different angular relations to the main saw blade.

9. A sawing device of the character described, including a stem, a main saw blade rigidly secured to the stem, a sleeve adjustably mounted upon the stem, means for clamping the sleeve in an adjusted position, a slide mounted upon the sleeve, yielding means tending to move the slide away from the main saw blade, an auxiliary saw blade carried by the slide, and means for mounting the auxiliary saw blade upon the slide in different angular relations to the main saw blade.

10. A sawing device of the character described, including a stem, a main saw blade rigidly secured to the stem at right angles thereto, a slide mounted upon the stem, yielding means normally tending to move the slide away from the main saw blade, a bracket hingedly connected to the slide, means for locking the bracket in different angular positions relative thereto, and an auxiliary saw blade carried by the bracket.

11. A sawing device of the character described, including a stem, a main saw blade mounted thereon, an auxiliary saw blade mounted thereon and arranged at an angle to the main saw blade, and means for permitting one of the saw blades to be moved transversely to itself while maintaining its inclination in the same plane.

12. A sawing device of the character described, including a stem, a main saw blade, an auxiliary saw blade arranged at an angle to the main saw blade, means for mounting the two saw blades upon the stem, one of the saw blades being movable thereon transversely to itself while maintaining its inclination in the same plane, and yielding means normally tending to move the said saw blade away from the other saw blade.

13. A notch sawing device of the character described, comprising a pair of saw blades having the blades thereof arranged in planes at an angle to each other and having the cutting edges thereof substantially parallel, and a mounting for the saw blades embodying means whereby one of the blades is movable transversely to itself.

14. A notch sawing device of the character described, comprising a pair of saw blades having the blades thereof arranged in planes at an angle to each other and having the cutting edges thereof substantially parallel, a mounting for the saw blades embodying means whereby one of the blades is movable transversely to itself, and yielding means normally tending to move the blades away from each other.

In testimony whereof I affix my signature.

JOHN A. KAYE.